Patented Oct. 18, 1949

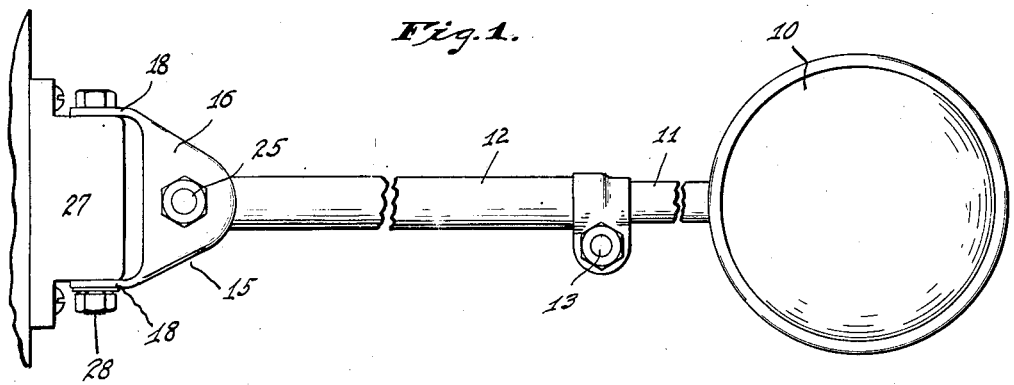
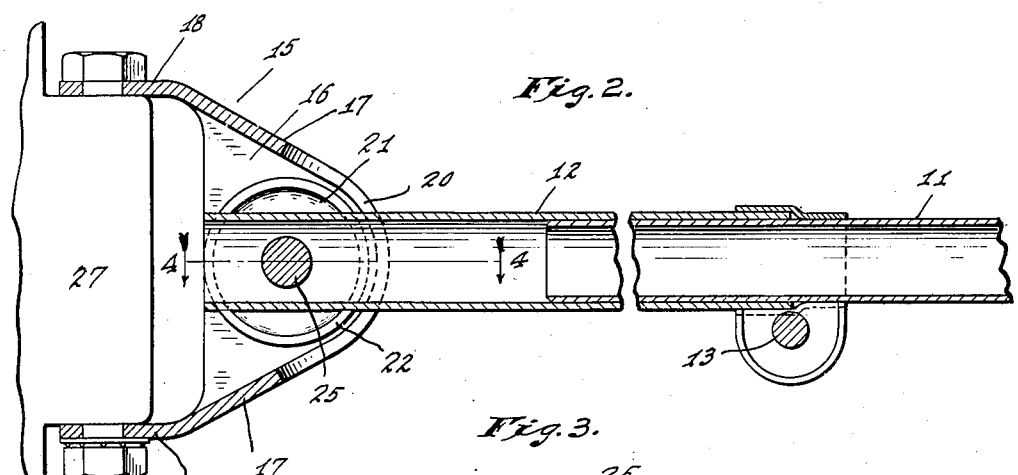
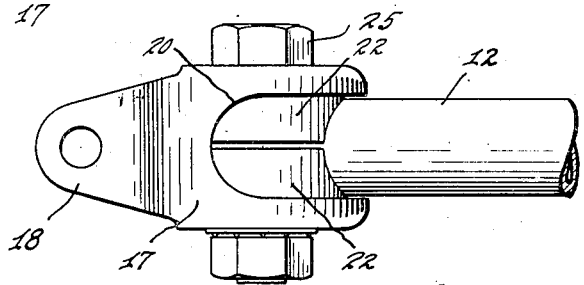
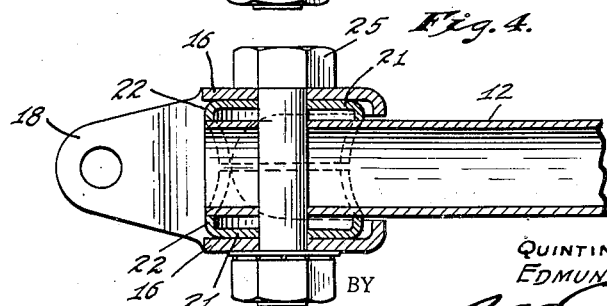

2,485,063

UNITED STATES PATENT OFFICE 2,485,063

MIRROR MOUNTING

Quintin G. Noblitt and Edmund Ludlow, Columbus, Ind., assignors to Noblitt-Sparks Industries, Inc., Columbus, Ind., a corporation of Indiana Application October 16, 1944, Serial No. 558,852

2 Claims. (Cl. 248—226)

Our invention relates to a mounting for a rear-vision mirror of the kind used on trucks or other large vehicles. Such mirrors are commonly mounted at the end of an elongated arm supported from the vehicle body or frame by a mounting which can be adjusted to dispose the mirror in any desired position. It is the object of our invention to produce a mounting which can be quickly adjusted to hold the mirror-supporting arm in any desired position, which can be firmly secured in any position of adjustment, and which can be manufactured without the necessity of maintaining undesirably close tolerances. Another object of our invention is to produce a mirror-mounting which can be manufactured largely of sheet-metal stampings and which can therefore be produced in quantity at a low cost.

In carrying out our invention, we mount the mirror at the outer end of an elongated arm, preferably tubular in cross-section. The inner end of such arm is received in diametrically opposite notches in the opposed annular flanges of two cup-like sheet metal stampings; and such stampings are in turn received between the parallel walls of a yoke having ears provided with alined holes for the reception of a pivot bolt by which the yoke is attached to the body or frame of the vehicle. A second pivot bolt extends axially of the cup-shaped stampings, through the tube and through the parallel walls of the yoke.

The accompanying drawing illustrates our invention: Fig. 1 is an elevation of the complete assembly of mirror and mounting; Fig. 2 is a fragmental view similar to Fig. 1 but on an enlarged scale and with some of the parts broken away to illustrate the construction more clearly; Fig. 3 is a plan view of the mounting; and Fig. 4 is a horizontal section on the line 4—4 of Fig. 2.

In the device illustrated in the drawing, the rear-vision mirror 10 is mounted on the outer end of a tube 11 which is telescopically received within a second tube 12. The two tubes provide an extensible mirror-supporting arm which can be adjusted to any desired length and held in adjustment by a clamp bolt 13. Our invention is not concerned with details of the arm 11—12 but rather with the means by which the inner end of the arm 12 is mounted upon the frame or body of a vehicle.

The mounting illustrated in the drawing comprises a yoke 15 conveniently drawn of sheet-metal and having spaced parallel side walls 16 united by an intermediate wall 17. Each of the parallel walls 16 of the yoke desirably has the shape of a triangle with a rounded apex, and the intermediate wall 17 extends around such apex, along the adjacent sides, and beyond the base of the triangle, where it is bent to provide two parallel ears 18.

At the rounded apex of the yoke, the intermediate wall 17 is provided with a slot 20 through which the tube 12 projects. Located on opposite sides of the tube 12 and within the yoke 15 are a pair of cup-shaped sheet-metal stampings each having a bottom wall 21 and an annular side wall 22. Each of the side walls 22 is provided with diametrically opposed notches shaped to conform generally to the curvature of the outer surface of the tube 12. The parallel yoke-walls 16, the bottom walls 21 of the cup-shaped stampings, and the tube 12 are provided with alined holes for the reception of a pivot bolt 25.

For the purpose of securing the yoke 15 on the vehicle, I mount on the frame or body of the vehicle a bracket 27 having a portion adapted to be received between the ears 18 of the yoke. Such bracket and the ears 18 are provided with alined holes receiving a pivot bolt 28. The two pivot bolts 25 and 28 lie in mutually perpendicular planes; and the bracket 27 is desirably mounted on the vehicle in such a way that the bolt 28 will be vertical and the bolt 25 horizontal.

As will be obvious from the drawing and the above description, the mirror 10 can be placed at any desired elevation by swinging the arm 11—12 about the axis of the pivot bolt 25, the slot 20 being long enough to permit the desired range of vertical adjustment of the mirror. The position of the mirror fore and aft of the vehicle can be varied by swinging the arm 11—12 and the yoke about the axis of the bolt 28; which can be tightened to clamp the yoke to the bracket when the desired position is attained. The cup-like stampings between which the tube is held are so proportioned that the edges of their side walls will be spaced apart when the notches in those side walls are firmly seated against the exterior surface of the tube 12. In addition, the distance between the bottom of the notches in each annular wall 22 and the outer face of the bottom 21 of the cup-like stamping is such that by tightening the bolt 25 the tube 12 may be firmly clamped between the cup-like stampings without permanently distorting the parallel side walls 16 of the yoke. As a result of this construction, tightening of the bolt 25 takes up all lost motion between the tube 12 and the cup-shaped stampings and firmly holds the assembly of cup-shaped stampings and arm 11—12 in fixed position about the axis of the bolt.

We claim as our invention:

1. In a mounting for rear-vision mirrors, a mirror supporting arm, a yoke having parallel side walls and adapted for attachment to a vehicle, a pair of co-axial cup-shaped members having bottom walls disposed respectively against the side walls of said yoke and annular walls extending toward each other, each of said annular walls being provided with diametrically opposite notches, said arm being disposed between said members and in said notches, and a pivot bolt extending through said parallel yoke-walls, the bottom walls of said members, and said arm and being capable of being tightened to clamp said members against said arm and the assembly of members and arm between said side walls.

2. In a mounting for rear-vision mirrors, a mirror supporting arm, a unitary yoke having parallel side walls and adapted for attachment to a vehicle, said arm extending into the space between said side walls, a pair of members disposed between said side walls on opposite sides of said arm, and a pivot bolt extending through said side walls, members, and arm, each of said members having provisions overlapping the arm longitudinally of the bolt and engaging said arm to prevent relative movement of the arm and member about the axis of said pivot bolt, the parts of the mounting being so proportioned and arranged that said pivot bolt, when tightened, will clamp said members against the arm and the assembly of members and arm between said side walls.

QUINTIN G. NOBLITT.
EDMUND LUDLOW.

REFERENCES CITED

The following references are of record in the file of this patent:

UNITED STATES PATENTS

| Number | Name | Date |
| --- | --- | --- |
| 1,305,285 | Hinsdill | June 3, 1919 |
| 1,449,658 | Deach | Mar. 27, 1923 |
| 2,113,251 | Dover | Apr. 5, 1938 |
| 2,310,353 | Dettmer | Feb. 10, 1943 |
| 2,393,056 | Noblitt et al. | Jan. 15, 1946 |